(12) United States Patent  
Nakada (10) Patent No.: US 6,931,495 B2
(45) Date of Patent: Aug. 16, 2005

(54) PROCESSOR AND METHOD OF ARITHMETIC PROCESSING THEREOF

(75) Inventor: Yasumasa Nakada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 10/256,079

(22) Filed: Sep. 27, 2002

(65) Prior Publication Data

US 2003/0061452 A1 Mar. 27, 2003

(30) Foreign Application Priority Data

Sep. 27, 2001 (JP) ....................................... 2001-296289

(51) Int. Cl.⁷ .............................................. G06F 12/00
(52) U.S. Cl. ...................... 711/144; 711/143; 711/145; 711/146; 710/22
(58) Field of Search ................................ 711/144, 145, 711/143, 141, 133, 146; 710/22

(56) References Cited

U.S. PATENT DOCUMENTS

| 5,155,824 | A | * | 10/1992 | Edenfield et al. | ........... 711/143 |
| 5,485,592 | A | | 1/1996 | Lau | |
| 5,586,297 | A | * | 12/1996 | Bryg et al. | ............ 711/143 |
| 5,623,633 | A | | 4/1997 | Zeller et al. | |
| 5,694,575 | A | | 12/1997 | Oba et al. | |
| 5,784,699 | A | * | 7/1998 | McMahon et al. | .......... 711/171 |
| 5,802,559 | A | * | 9/1998 | Bailey | ........................ 711/118 |
| 5,860,105 | A | * | 1/1999 | McDermott et al. | ........ 711/135 |
| 5,860,111 | A | * | 1/1999 | Martinez et al. | ............ 711/143 |
| 6,119,205 | A | * | 9/2000 | Wicki et al. | ................. 711/143 |
| 6,272,033 | B1 | * | 8/2001 | Watt | ............................. 365/49 |
| 6,658,537 | B2 | * | 12/2003 | Hughes et al. | ............... 711/141 |
| 6,754,781 | B2 | * | 6/2004 | Chauvel et al. | ............. 711/143 |
| 2001/0049771 | A1 | * | 12/2001 | Tischler et al. | ............. 711/133 |
| 2002/0065985 | A1 | * | 5/2002 | Garnett et al. | .............. 711/117 |
| 2002/0169947 | A1 | * | 11/2002 | Bilardi et al. | ................ 712/219 |

FOREIGN PATENT DOCUMENTS

| EP | 0 674 267 | 9/1995 | |
| EP | 0 683 457 | 11/1995 | |
| EP | 0 797 148 | 9/1997 | |
| EP | 1298532 A2 | * 4/2003 | ........... G06F/12/08 |

* cited by examiner

Primary Examiner—Hong Kim
(74) Attorney, Agent, or Firm—Oblon, Spivak, McClelland, Maier & Neustadt, P.C.

(57) ABSTRACT

A processor system, comprising: a processor having a function to write back data stored in a cache memory to an external memory in units of a cache line formed of a plurality of words; a small unit dirty information storing part which stores non-write-back information in units of address range smaller than that of the cache line, the information indicating that the write-back to the external memory is not yet performed; a mode information storing part which stores specific mode flag information which is set or reset by software in order to determine whether or not to be in a mode for not performing unnecessary write-back operation; and; a write-back determining part which decides whether or not to write back a certain cache line before performing the DMA transfer based on the non-write-back information, when the specific mode flag is set and the write-back of the cache line is instructed.

15 Claims, 5 Drawing Sheets

PROCESSOR AND METHOD OF ARITHMETIC PROCESSING THEREOF

CROSS REFERENCE TO RELATED APPLICATIONS

This application is based upon and claims the benefit of priority from the prior Japanese Patent Applications No. 2001-296289, filed on Sep. 27, 2001, the entire contents of which are incorporated herein by reference.

BACKGROUND OF THE INVENTION

1. Field of the Invention

The present invention relates to a processor system which includes a processor having a function for writing back data stored in a cache memory to an external memory. Especially, the present invention relates to a processor system capable of performing DMA transfer from an I/O circuit to the external memory.

2. Related Background Art

Operation frequency of a processor tends to increase year by year. However, an external memory used for a main memory is not faster than the processor. Because of this, a cache memory is generally used to infill a difference of speed between the processor and the external memory.

The cache memory sends and receives data in regard to the external memory for each cache line formed of a plurality of words. In the case of a system having the cache memory called as a write-back cache, data written into the cache memory by the processor has to be written back to the external memory. Because of this, a dirty bit indicating whether or not the data has been written back to the external memory is provided for each cache line. When the dirty bit is set, it is indicated that the write-back to the external memory is not yet finished.

Various I/O circuits are connected to the processor. When data is transferred by the DMA (Direct Memory Access) transfer between each I/O circuit and the external memory without passing through the processor, the processing burden of the processor is reduced, and it is possible to transfer data from the I/O circuit to the external memory at high latency.

However, the DMA transfer in which data is transferred from the external memory to the I/O circuits and the copy of this data in the cache memory is dirty may be instructed. In such a case, before a performing the DMA transfer, the write-back operation has to be performed in regard to the external memory. Furthermore, when the DMA transfer is performed in regard to the address range including the address of the cache line to which the write-back operation is not yet performed, it is necessary to invalidate the cache line. Otherwise, if the dirty bit of the cache line is set, it is necessary to perform the write-back operation and then to invalidate the cache line.

Figure 8:
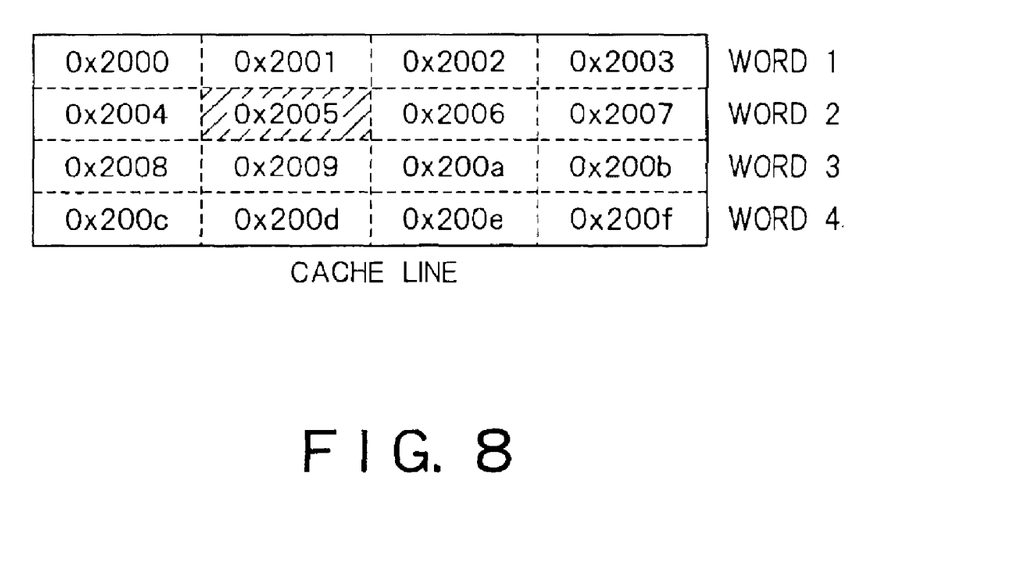
FIG. 8 is a diagram describing the write-back operation of the cache memory.

For example, FIG. 8 shows an example in which "0x2000" is stored in the tag for storing the address information of the cache memory and a certain cache line is formed of four words. In this case, four words data from 0x2000 to 0x200f is stored in the cache line.

In the case of FIG. 8, even if only a portion of the cache line is updated, the dirty bit of the cache line is set. That is, it is impossible to know the updated location of the cache line.

When the dirty bit is set, and for example, one word data from address 0x2004 is transferred by DMA from the I/O circuit to the external memory, the write-back operation of the cache line is first performed before the DMA transfer.

However, when only one byte of address 0x2005 is updated in the cache line, this one byte is rewritten by the DMA transfer. Because of this, the write-back operation becomes meaningless.

Thus, although the conventional processor system has dirty bits in units of the cache line, it has no information indicating the updated location in the cache line. Because of this, despite being practically unnecessary, the write-back operation may be performed, thereby causing the unnecessary bus transaction.

Furthermore, in order to avoid occurrence of such an unnecessary bus transaction, a method of changing data declaration so that data is arranged one by one when defining data as a target of DMA may be adopted. The method is that, for example, dummy declaration is inserted between data declarations. Such a method causes development efficiency of software to lower.

On the other hand, in the case of the processor having a snoop function for detecting whether or not to hold newest data in the cache memory to be stored in the external memory, the operation for maintaining data consistency by software is unnecessary. In the case of performing the DMA transfer from the I/O circuit to the external memory, the following operation is performed by hardware.

When the cache-hit of the subject for the DMA transfer occurs, the cache line is invalidated. When the dirty bit is set to the cache line, the cache line is written back before performing the DMA transfer, and then the DMA transfer is performed.

Even in this case, for example, when address 0x2000 is stored in the tag and the dirty bit is set, even if data to be updated exists in only the address 0x2005, the entire cache line is written back.

Thus, because the conventional processor having the snoop function did not have the information indicating the updated location in the cache line, the write-back operation is necessary, thereby occurring the unnecessary bus transaction.

Furthermore, when the method for changing the data declaration by software is adopted, there was a problem in which the development efficiency of software deteriorates.

SUMMARY OF THE INVENTION

A processor system according to one embodiment of the present invention, comprising:

a processor having a function to write back data stored in a cache memory to an external memory in units of a cache line formed of a plurality of words;

a small unit dirty information storing part which stores non-write-back information in units of address range smaller than that of said cache line, said information indicating that the write-back to said external memory is not yet performed;

a mode information storing part which stores specific mode flag information which is set or reset in order to determine whether or not to be in a mode for not performing unnecessary write-back operation; and a write-back determining part which decides whether or not to write back a certain cache line before performing the DMA transfer based on said non-write-back information, when said specific mode flag is set or reset by software in order to determine whether or not to be in a mode for not performing unnecessary write-back operation.

A method of arithmetic processing of a processor according to one embodiment of the present invention, said method having a function to write back data stored in a cache memory to an external memory, in units of a cache line consisted of a plurality of words, comprising:

storing non-write-back information in units of address range smaller than that of said cache line, said information indicating that the write-back to said external memory is not yet performed;

storing specific mode flag information which is set or reset in order to determine whether or not to be in a mode for not performing unnecessary write-back operation; and determining whether or not to write back the cache line before the DMA transfer based on said non-write-back information when said specific mode flag is set and the write-back of a certain cache line is instructed.

DESCRIPTION OF THE PREFERRED EMBODIMENTS

Hereinafter, a processor system according to the present invention will be more specifically described with reference to drawings.

(First Embodiment)

Figure 1:
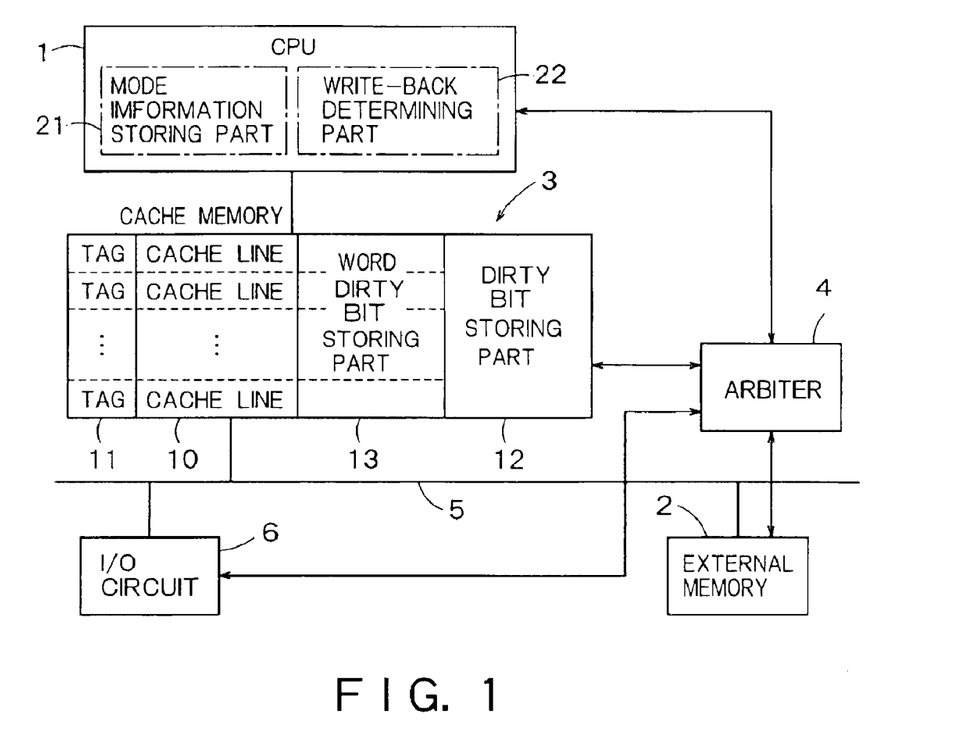
FIG. 1 is a diagram showing schematic configuration a processor system according to a first embodiment of the present invention.
Figure 2:
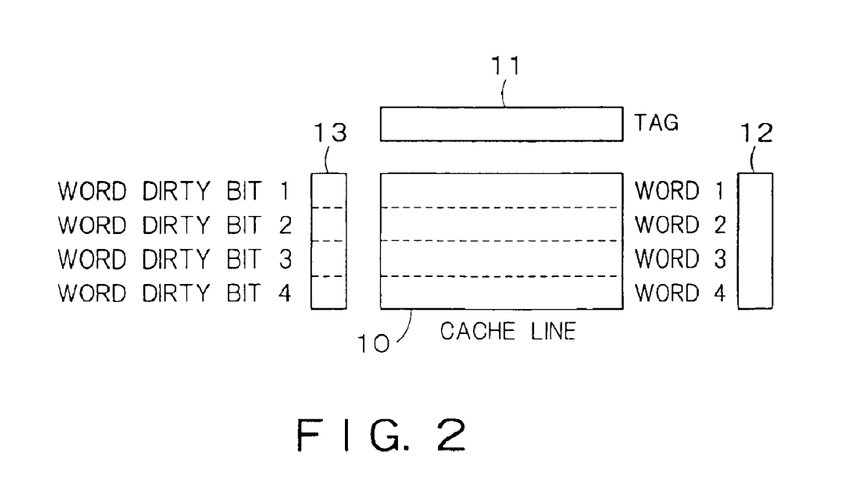
FIG. 2 is a block diagram showing schematic configuration of a cache memory of the first embodiment.

FIG. 1 is a block diagram showing schematic configuration of a processor system according to a first embodiment of the present invention. The processor system of FIG. 1 has a CPU 1 for performing various arithmetic processings based on the designated program, an external memory 2, a cache memory 3 for temporarily storing data to be stored in the external memory 2, and an arbiter 4 for arbitrating a bus. The cache memory 3, the external memory 2 and the arbiter 4 are connected to the bus 5. Various I/O circuits 6 are connected to the bus 5.

The cache memory 3 updates data in units of a cache line 10 formed of a plurality of word data. The cache memory 3 has a tag 11 for storing address information corresponding to data of each cache line 10, a dirty bit storing part 12 for storing information (dirty bit) indicating whether or not it is necessary to write back data of the cache line 10 to the external memory 2, and a word dirty bit storing part 13 for storing information indicating that the write-back to the external memory 2 is not yet finished for each of words 1–4 in the cache line 10.

The word dirty bits are set when the corresponding word data is in the dirty state (the state in which the word data is updated, and the write-back to the external memory 2 is not yet performed). At this time, the dirty bit of the cache line 10 in which the word data belongs is also set.

The CPU 1 has a mode information storing part 21 for storing a specific mode flag indicating a mode (a mode of the present invention) for determining whether or not to write back the corresponding address of the cache memory 3 when the DMA (Direct Memory Access) transfer is performed from the I/O circuit 6 to the external memory 2, and a write-back determining part 22 for deciding whether or not to practically perform the write-back to the cache line 10.

The write-back determining part 22 determines whether or not to practically perform the write-back to the cache line 10 based on the information stored in the word dirty bit storing part 13 when the specific mode flag is set and the write-back of a certain cache line 10 is instructed.

Figure 3:
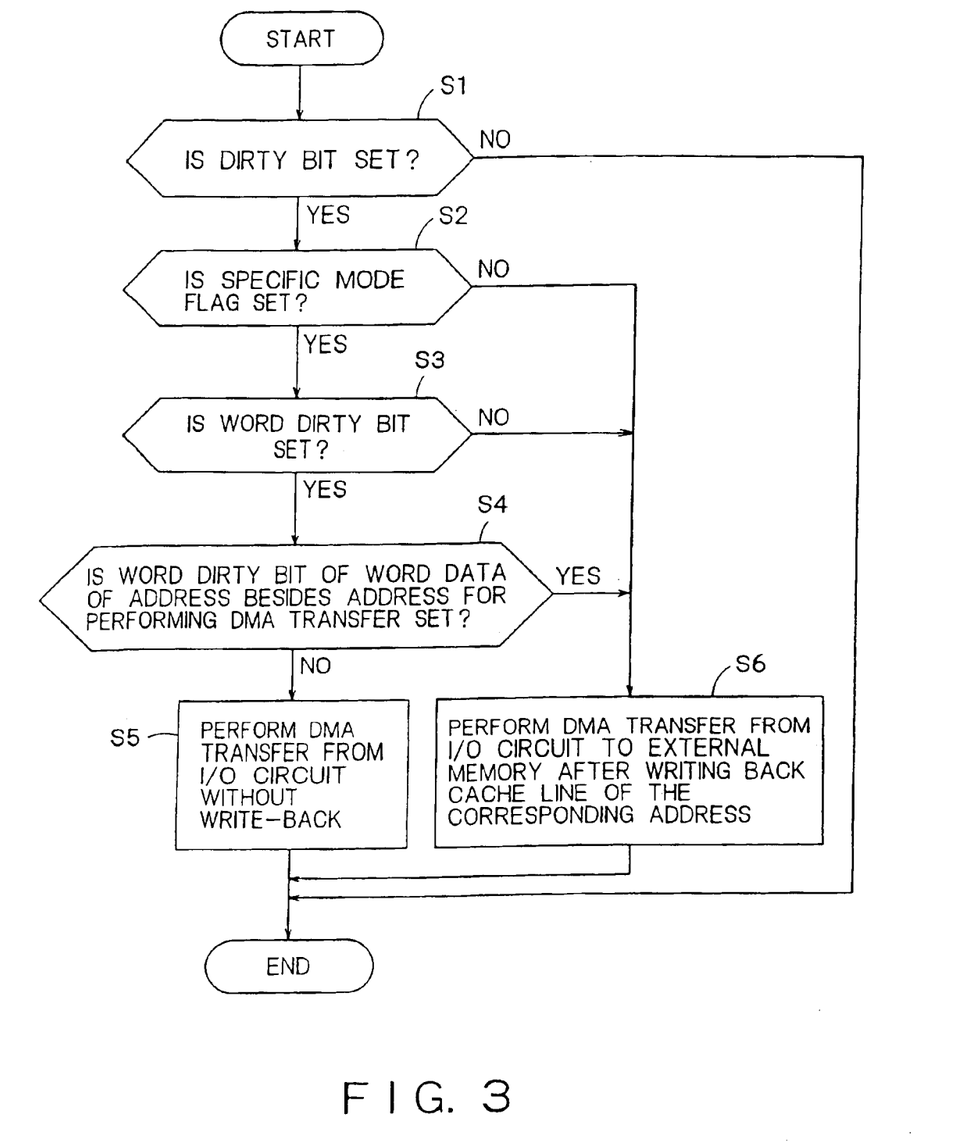
FIG. 3 is a flowchart showing processing operation of a write-back determining part.

FIG. 3 is a flowchart showing processing operation of the write-back determining part 22. First, it is determined whether or not the dirty bit of the cache line corresponding to the address for performing the DMA transfer is set (step S1). If determined that the dirty bit is not set, the processings of FIG. 3 is finished.

If determined that the above-mentioned dirty bit is set, it is next determined whether or not the specific mode flag is set (step S2). The flag is set by software, and indicates whether or not to enter a mode for reducing bus transaction proposed by the present invention. If determined that the flag is not set, the after-mentioned processing of step S6 is performed.

When the specific mode flag is set, it is determined whether or not the word dirty bit of the word data of the address besides the address for performing the DMA transfer is set (step S3).

When the determination of step S4 is denied, that is, when all the word data that the word dirty bits are set is included in DMA object, the DMA transfer from the I/O circuit 6 is performed without performing the write-back (step S5).

On the other hand, when the determination of step S4 is affirmative, that is, when the word dirty bit is set in regard to the word data besides the word data as the subject of the DMA transfer, the write-back of the cache line 10 corresponding to the corresponding address is performed, and then the DMA transfer from the I/O circuit 6 to the external memory 2 is performed (step S6).

Thus, according to the first embodiment, the word dirty bit indicating whether or not each word data in the cache line 10 is in the dirty state is provided for each word data. When the DMA transfer is instructed in regard to the addresses corresponding to all the word data that the word dirty bits are set (when the DMA objective area includes all the word data that the word dirty bits are set), the DMA transfer from the I/O circuit 6 is performed without writing back the cache line 10. Because of this, unnecessary bus transaction can be reduced. Furthermore, it is unnecessary to modify software processings such as consideration of cache boundary in the case of performing declaration of variables_in order to reduce unnecessary bus transaction. Accordingly, it is possible to improve the development efficiency of software.

(Second Embodiment)

Figure 4:
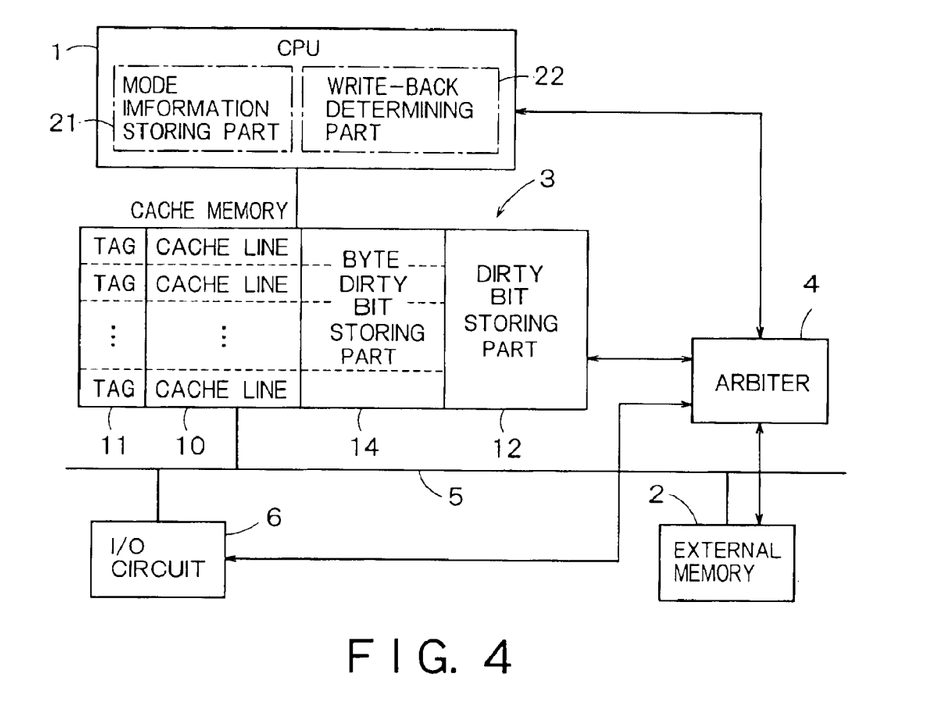
FIG. 4 is a block diagram showing schematic configuration of a processor system according to a second embodiment of the present invention.

FIG. 4 is a block diagram showing schematic configuration of a processor system according to a second embodiment of the present invention. In FIG. 4, the same reference numerals are attached to constituents common to those of FIG. 1. Hereinafter, differences from FIG. 1 will be mainly described.

A cache memory 3 of FIG. 4 has a byte dirty storing part 14 for storing information indicating that the write-back to the external memory 2 is not yet performed for each byte data in the cache line 10.

A write-back determining part 22 in the CPU 1 performs the DMA transfer from the I/O circuit 6 without writing back the cache line 10 when addresses corresponding to all the byte data that the byte dirty bit is set is included in the addresses of DMA transfer objective of data transferred from the I/O circuits to the main memory, and performs the DMA transfer from the I/O circuit 6 after writing back the cache line 10 when at least one bit of the byte dirty bits of the byte data corresponding to the addresses in the cache line that the DMA transfer is not indicated is also set.

Thus, according to the second, embodiment, the byte dirty bit indicating whether or not each byte data in the cache line 10 is in the dirty state is provided for each byte data, and the DMA transfer from the I/O circuit 6 is performed without writing back the cache line 10 when in the case of the DMA transfer from the I/O circuits to the external memory, the dirty bit of the cache line of the DMA objective is set, and the byte dirty bit of data besides the DMA objective in the cache line is not set. Because of this, unnecessary bus transaction can be reduced. Furthermore, it is unnecessary to modify software processing in order to reduce unnecessary bus transaction, thereby improving development efficiency of software.

Especially, according to the second embodiment, because the byte dirty bits indicating whether or not each byte data in the cache line 10 is in the dirty state are provided for each byte data, it is possible to perform the determination of whether or not the write-back is necessary more strictly than in the first embodiment.

(Third Embodiment)

Figure 6:
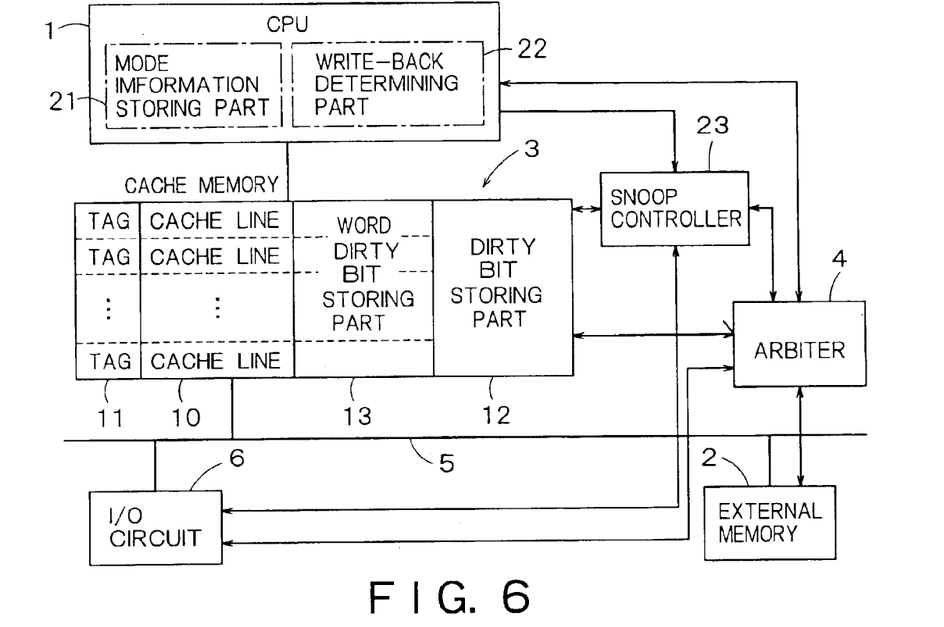
FIG. 6 is a block diagram showing schematic configuration of a processor system according to a third embodiment of the present invention.

FIG. 6 is a block diagram showing schematic configuration of a processor system according to a third embodiment of the present invention. In FIG. 6, the same reference numerals are attached to constituents common to those of FIG. 1. Hereinafter, differences from FIG. 1 will be mainly described.

A processor system of FIG. 6 has a snoop controller 23 realizing snoop function, besides configuration of FIG. 1. Here, the snoop determines whether or not the cache memory holds data corresponding to the address by confirming the address of the DMA transfer appearing on the bus when the I/O circuit performs the DMA transfer, and performs necessary processings in regard to the cache memory in accordance with the kinds of the DMA transfer.

In the case of performing the DMA transfer from the I/O circuit 6 to the external memory 2, when the address issued by the snoop controller 23 hits to a certain cache line 10 at the state in which the specific mode flag is set, the dirty bit of the cache line is set and the word dirty bit except for the word data corresponding to the address of DMA objective in the cache line including the address is not set, or when the dirty bit of the cache line is not set, the DMA transfer from the I/O circuit 6 is performed without writing back the cache line 10, and when at least one bit of the word dirty bits corresponding to data except for the DMA objective in the cache line is set, the write-back of the cache line 10 is performed, and then the DMA transfer from the I/O circuit 6 is performed.

Thus, according to the third embodiment, in the processor system having snoop function, as a result of performing snoop processing, even if determined that the newest data is not stored in the external memory 2, when the word data to be written back is overwritten by the DMA transfer, the DMA transfer from the I/O circuit 6 is performed without the write-back. Because of this, similarly to the first and second embodiments, it is possible to reduce unnecessary bus transaction.

Figure 5:
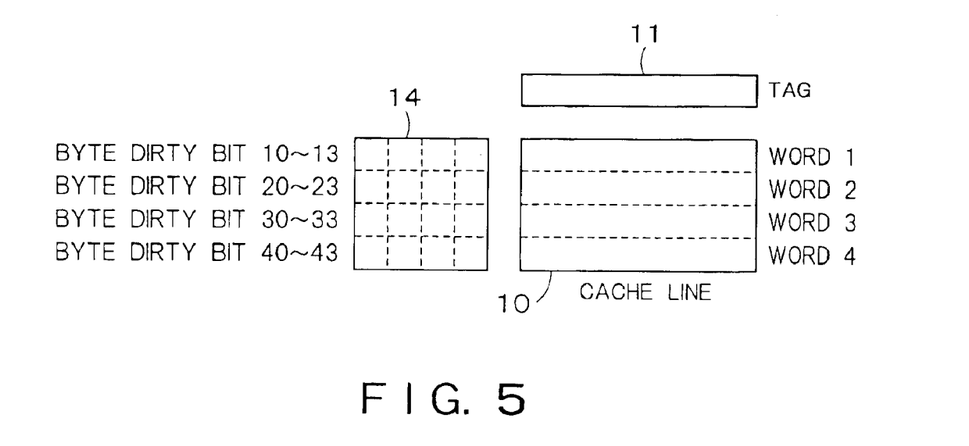
FIG. 5 is a block diagram showing a detailed configuration of a cache memory of the second embodiment.
Figure 7:
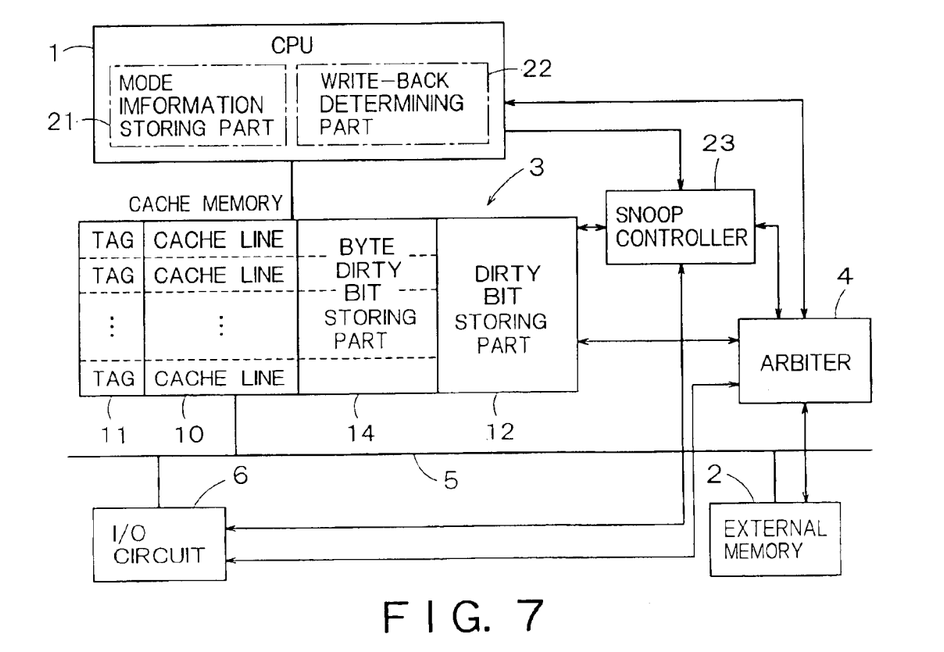
FIG. 7 is a block diagram showing a modified example of the third embodiment.

Although FIG. 6 shows the example in which the word dirty bits are provided for the respective word data in the cache line 10, the byte dirty bits may be provided for the respective byte data in the cache line 10. The block diagram in this case is shown in FIG. 7. In this case, both of advantageous effects of the processor systems of FIG. 3 and FIG. 5 are obtained.

What is claimed is:

1. A processor system, comprising:
    a processor adapted to write back data stored in a cache memory to an external memory in units of a cache line formed of a plurality of words;
    a small unit dirty information storing part adapted to store non-write-back information in units of address range smaller than that of said cache line, said information indicating that the write-back to said external memory is not yet performed;
    a mode information storing part adapted to store specific mode flag information which is set or reset in order to determine whether to be in a mode for not performing unnecessary write-back operation; and
    a write-back determining part adapted to decide whether to write back a certain cache line before performing a DMA transfer based on said non-write-back information, when said specific mode flag is set and the write-back of the cache line is instructed, and adapted to perform the DMA transfer after writing back said cache line when said specific mode flag is not set.

2. The processor system according to claim 1, wherein said small unit dirty information storing part stores said non-write-back information in units of word or byte included in the cache line.

3. The processor system according to claim 1, further comprising a large unit dirty information storing part which stores for each cache line, information indicating whether or not data in said cache memory has to be written back to said external memory.

4. The processor system according to claim 1, wherein said small unit dirty information storing part is provided to inside of said cache memory, and said mode information storing part is provided to inside of said processor.

5. The processor system according to claim 1, further comprising a snoop control part which searches whether or not said cache memory holds newest data to be stored in said external memory,
    wherein said write-back-determining part determines whether or not to write back the cache line based on said non-write-back information when said specific mode flag is set and the write-back of a certain cache line is instructed by said snoop control part.

6. A processor system, comprising:
    a processor adapted to write back data stored in a cache memory to an external memory in units of a cache line formed of a plurality of words;
    a small unit dirty information storing part adapted to store non-write-back information in units of address range smaller than that of said cache line, said information indicating that the write-back to said external memory is not yet performed;
    a mode information storing part adapted to store specific mode flag information which is set or reset in order to determine whether to be in a mode for not performing unnecessary write-back operation; and a write-back determining part adapted to decide whether to write back a certain cache line before performing a DMA transfer based on said non-write-back information, when said specific mode flag is set and the write-back of the cache line is instructed, and adapted to perform the DMA transfer after writing back said cache line when said specific mode flag is not set, wherein said write-back determining part performs the DMA transfer without writing back the cache line, when the DMA transfer from an I/O circuit to the external memory is instructed, a dirty bit of the cache line in which DMA objective is included is set, and all of said non-write-back information stored in said small unit dirty information storing part except for the DMA objective data in the cache line is not set.

7. A processor system, comprising:

a processor adapted to write back data stored in a cache memory to an external memory in units of a cache line formed of a plurality of words;

a small unit dirty information storing part adapted to store non-write-back information in units of address range smaller than that of said cache line, said information indicating that the write-back to said external memory is not yet performed;

a mode information storing part adapted to store specific mode flag information which is set or reset in order to determine whether to be in a mode for not performing unnecessary write-back operation; and a write-back determining part adapted to decide whether to write back a certain cache line before performing a DMA transfer based on said non-write-back information, when said specific mode flag is set and the write-back of the cache line is instructed, and adapted to perform the DMA transfer after writing back said cache line when said specific mode flag is not set, wherein said write-back determining part performs the DMA transfer after performing the write-back of the cache line, when the DMA transfer from an I/O circuit to said external memory is instructed, a dirty bit of the cache line in which DMA objective is included is set and at least one of said non-write-back information stored in said small unit dirty information storing part except for the DMA objective data in the cache line is set.

8. A method of arithmetic processing of a processor adapted to write back data stored in a cache memory to an external memory, in units of a cache line consisted of a plurality of words, comprising:

storing non-write-back information in units of address range smaller than that of said cache line, said information indicating that the write-back to said external memory is not yet performed;

storing specific mode flag information which is set or reset in order to determine whether to be in a mode for not performing unnecessary write-back operation, said specific mode flag information being set when data of addresses in the case that data is transferred by DMA (Direct Memory Access) transfer from an I/O circuit to said external memory is stored in said cache memory;

determining whether to write back the cache line before a DMA transfer based on said non-write-back information when said specific mode flag is set and the write-back of a certain cache line is instructed; and performing the DMA transfer after writing back said cache line when said specific mode flag is not set.

9. The method of arithmetic processing of the processor according to claim 8, wherein when determining whether to write back the cache line before the DMA transfer, if said specific mode flag is not set, the cache line is set and then the DMA transfer is performed.

10. The method of arithmetic processing of the processor according to claim 8, wherein said non-write-back information is stored in units of word or byte included in the cache line.

11. The method of arithmetic processing of the processor according to claim 8, wherein information indicative of whether data in said cache memory has to be written back is stored for each cache line.

12. The method of arithmetic processing of the processor according to claim 8, wherein said non-write back information is stored in said cache memory, and said specific mode flag information is stored in said processor.

13. The method of arithmetic processing of the processor according to claim 8, further comprising a snoop control part which searches whether or not said cache memory holds newest data to be stored in said external memory, wherein said write-back-determining part determines whether or not to write back the cache line based on said non-write-back information when said specific mode flag is set and the write-back of a certain cache line is instructed by said snoop control part.

14. The A method of arithmetic processing of the processor according to claim 8, a processor adapted to write back data stored in a cache memory to an external memory, in units of a cache line consisted of a plurality of words, comprising:

storing non-write-back information in units of address range smaller than that of said cache line, said information indicating that the write-back to said external memory is not yet performed;

storing specific mode flag information which is set or reset in order to determine whether to be in a mode for not performing unnecessary write-back operation, said specific mode flag information being set when data of addresses in the case that data is transferred by DMA (Direct Memory Access) transfer from an I/O circuit to said external memory is stored in said cache memory;

determining whether to write back the cache line before a DMA transfer based on said non-write-back information when said specific mode flag is set and the write-back of a certain cache line is instructed, when determining whether to write back the cache line before the DMA transfer, if the DMA transfer from said I/O circuit to said external memory is instructed with respect to addresses corresponding to a portion of said non-write-back information, the cache line is written back and then the DMA transfer is performed.

15. A method of arithmetic processing of a processor adapted to write back data stored in a cache memory to an external memory, in units of a cache line consisted of a plurality of words, comprising:

storing non-write-back information in units of address range smaller than that of said cache line, said information indicating that the write-back to said external memory is not yet performed;

storing specific mode flag information which is set or reset in order to determine whether to be in a mode for not performing unnecessary write-back operation, said specific mode flag information being set when data of addresses in the case that data is transferred by DMA (Direct Memory Access) transfer from an I/O circuit to said external memory is stored in said cache memory;

determining whether to write back the cache line before a DMA transfer based on said non-write-back information when said specific mode flag is set and the write-back of a certain cache line is instructed, when determining whether to write back the cache line before the DMA transfer, if the DMA transfer from said I/O circuit to said external memory is instructed with respect to all addresses corresponding to all of said non-write-back information, the DMA transfer is performed without writing back the cache line.

* * * * *